United States Patent
Sandusky et al.

(10) Patent No.: US 10,218,275 B2
(45) Date of Patent: Feb. 26, 2019

(54) MULTI-STAGE VOLTAGE MULTIPLICATION CIRCUIT FOR INVERTING A DIRECT CURRENT POWER SIGNAL

(71) Applicant: Smart Prong Technologies, Inc., Irvine, CA (US)

(72) Inventors: Randall L. Sandusky, Divide, CO (US); Neaz E. Farooqi, Colorado Springs, CO (US)

(73) Assignee: Smart Prong Technologies, Inc., Irvine, CA (US)

( * ) Notice: Subject to any disclaimer, the term of this patent is extended or adjusted under 35 U.S.C. 154(b) by 0 days.

(21) Appl. No.: 15/667,419

(22) Filed: Aug. 2, 2017

(65) Prior Publication Data

US 2018/0041114 A1 Feb. 8, 2018

Related U.S. Application Data

(60) Provisional application No. 62/370,168, filed on Aug. 2, 2016.

(51) Int. Cl.
*H02M 3/24* (2006.01)
*H02M 1/00* (2006.01)
*H02J 3/38* (2006.01)
*H02M 3/07* (2006.01)
(Continued)

(52) U.S. Cl.
CPC ............... *H02M 3/24* (2013.01); *H02J 3/385* (2013.01); *H02M 1/00* (2013.01); *H02M 3/07* (2013.01); *H02M 7/44* (2013.01); *H02M 7/48* (2013.01); *H02M 2001/007* (2013.01); *H02M 2001/0009* (2013.01)

(58) Field of Classification Search
CPC ............ H02M 7/44; H02M 3/07; H02M 7/48; H02M 2001/0009; H02M 2001/007; H02M 1/00; H02M 3/24; H02J 3/385
See application file for complete search history.

(56) References Cited

U.S. PATENT DOCUMENTS

| | | | |
|---|---|---|---|
| 8,854,019 B1 * | 10/2014 | Levesque | H02M 3/07 323/266 |
| 8,860,396 B2 * | 10/2014 | Giuliano | H02M 3/07 323/266 |
| 2006/0017388 A1 | 1/2006 | Stevenson | |

(Continued)

*Primary Examiner* — Jue Zhang
*Assistant Examiner* — Jye-June Lee
(74) *Attorney, Agent, or Firm* — Maschoff Brennan (57) ABSTRACT

A boost circuit receives a DC signal at a first voltage, a duty clock, a reference at a second voltage, and a second intermediate signal at a fourth voltage; compares the reference and the second intermediate signal; generates a first intermediate signal at a third voltage based on the duty clock and the comparison of the reference and the second intermediate signal; and adjusts the third voltage to cause the fourth voltage to approach the second voltage based on the comparison of the reference and the second intermediate signal. The voltage converter receives the first intermediate signal at the second voltage and a clock and generates the second intermediate signal at the fourth voltage, which may be greater than the third voltage. The voltage driver receives the second intermediate signal at the fourth voltage and generates an AC signal at an AC voltage based on the second intermediate signal.

13 Claims, 4 Drawing Sheets (51) Int. Cl.
*H02M 7/44* (2006.01)
*H02M 7/48* (2007.01)

(56) References Cited

U.S. PATENT DOCUMENTS

| | | | |
|---|---|---|---|
| 2008/0157733 A1* | 7/2008 | Williams | H02M 3/07 |
| | | | 323/266 |
| 2011/0157929 A1 | 6/2011 | Sun et al. | |
| 2012/0087159 A1* | 4/2012 | Chapman | H02M 7/48 |
| | | | 363/41 |
| 2012/0113702 A1 | 5/2012 | Rigbers | |
| 2015/0070949 A1 | 3/2015 | Mukhopadhyay et al. | |
| 2015/0280455 A1 | 10/2015 | Bosshard et al. | |
| 2017/0033694 A1 | 2/2017 | Tseng et al. | |

\* cited by examiner

MULTI-STAGE VOLTAGE MULTIPLICATION CIRCUIT FOR INVERTING A DIRECT CURRENT POWER SIGNAL

CROSS-REFERENCE TO RELATED APPLICATION

This patent application claims benefit of and priority to U.S. Provisional App. No. 62/370,168 filed Aug. 2, 2016, which is incorporated herein by reference in its entirety

FIELD

The embodiments discussed in the present disclosure are related to voltage multiplication within an electronic device.

BACKGROUND

The use of solar panel is useful option for delivering power to a power grid or an electric vehicle power train. Despite an increase in the use of solar panels, there still remains various limitations for delivering power from solar panels to power grids and electric vehicle power trains.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system for multiplying a voltage. The system may include a boost circuit, a voltage converter circuit, and a voltage driver circuit. The boost circuit may receive a direct current (DC) signal at a first DC voltage, a duty clock signal, a reference DC signal at a second DC voltage, and a second intermediate DC signal at a fourth DC voltage. The boost circuit may also compare the reference DC signal and the second intermediate DC signal. The boost circuit may additionally generate a first intermediate DC signal at a third DC voltage based on the duty clock signal and the comparison of the reference DC signal and the second intermediate DC signal. The boost circuit may adjust the third DC voltage of the first intermediate DC signal to cause the fourth DC voltage of the second intermediate DC signal to approach the second DC voltage of the reference DC signal based on the comparison of the reference DC signal and the second intermediate DC signal. The voltage converter circuit may be electrically coupled to the boost circuit and may receive the first intermediate DC signal at the second DC voltage and a clock signal. The voltage converter circuit may also generate the second intermediate DC signal at the fourth DC voltage The fourth DC voltage of the second intermediate DC signal may be greater than the third DC voltage of the first intermediate DC signal. The voltage driver circuit may be electrically coupled to the voltage converter circuit and may receive the second intermediate DC signal at the fourth DC voltage. The voltage driver circuit may also generate an alternating current (AC) signal at an AC voltage based on the second intermediate DC signal at the fourth DC voltage.

One or more embodiments of the present disclosure may include a method of multiplying a voltage. The method may include receiving a DC signal at a first DC voltage, a duty clock signal, and a reference DC signal at a second DC voltage. The method may also include receiving a second intermediate DC signal at a fourth DC voltage. The method may additionally include comparing the reference DC signal and the second intermediate DC signal. The method may include generating a first intermediate DC signal at a third DC voltage based on the duty clock signal and the comparison of the reference DC signal and the second intermediate DC signal. The third DC voltage of the first intermediate DC signal may be adjusted to cause the fourth DC voltage of the second intermediate DC signal to approach the second DC voltage of the reference DC signal based on the comparison of the reference DC signal and the second intermediate DC signal. The method may also include receiving the first intermediate DC signal at the second DC voltage. The method may additionally include receiving a clock signal. The method may include generating the second intermediate DC signal at the fourth DC voltage. The fourth DC voltage of the second intermediate DC signal may be greater than the third DC voltage of the first intermediate DC signal. The method may also include receiving the second intermediate DC signal at the fourth DC voltage. The method may additionally include generating an AC signal at an AC voltage based on the second intermediate DC signal at the fourth DC voltage.

One or more embodiments of the present disclosure may include a system for multiplying a voltage. The system may include a boost circuit, a voltage converter circuit, a voltage driver circuit, and an LC filter circuit. The boost circuit may include a comparator circuit, a servo loop circuit, and a switching inductive circuit. The comparator circuit may receive a reference DC signal at a second DC voltage. The comparator circuit may also receive a second intermediate DC signal at a fourth DC voltage. The comparator circuit may additionally compare the reference DC signal and the second intermediate DC signal. The comparator circuit may generate a comparison signal based on the comparison of the reference DC signal and the second intermediate DC signal. The servo loop control circuit may be electrically coupled to the comparator circuit and may receive the comparison signal. The servo loop control circuit may also generate a gate driver signal based on the comparison signal. The switching inductive circuit may be electrically coupled to the servo loop control circuit and the voltage converter circuit and may receive a DC signal at a first DC voltage and a duty clock signal. The switching inductive circuit may also generate a first intermediate DC signal at a third DC voltage based on the duty clock signal and the gate driver signal. The voltage converter circuit may be electrically coupled to the switching inductive circuit and the comparator circuit and may receive the first intermediate DC signal at the second DC voltage. The voltage converter circuit may also receive a clock signal. The voltage converter circuit may additionally generate the second intermediate DC signal at the fourth DC voltage. The fourth DC voltage of the second intermediate DC signal may be greater than the third DC voltage of the first intermediate DC signal. The switching inductive circuit may adjust the third DC voltage of the first intermediate DC signal to cause the fourth DC voltage of the second intermediate DC signal to approach the second DC voltage of the reference DC signal based on the gate driver signal and the duty clock signal. The voltage driver circuit may be electrically coupled to the voltage converter circuit and may receive the second intermediate DC signal at the fourth DC voltage. The voltage driver circuit may also generate an AC signal at an AC voltage based on the second intermediate DC signal at the fourth DC voltage. The LC filter circuit may be electrically coupled to the voltage driver circuit and may receive the AC signal at the AC voltage. The LC filter circuit may also generate a filtered AC signal based on the AC signal at the AC voltage.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Some embodiments of the present disclosure relate to improvements to voltage multiplication of a direct current (DC) signal to an alternating current (AC) signal within an electronic device to provide the AC signal to an external device (such as AC mains). For example, a voltage multiplication circuit may include a high-voltage converter integrated circuit (IC) and a low-voltage power controller IC. The high-voltage converter IC may receive an input DC signal at $V_{IN}$ and may output an AC signal at $V_{OUT}$ to the external device. The high-voltage converter IC may include multiple stages of boost and/or inversion so as to output the AC signal at an appropriate level for an external device. In some embodiments, a boost regulator circuit may receive the input DC signal at $V_{IN}$, a duty clock signal, a reference signal at $V_{REF}$, and a second intermediate DC signal at $V_{INT2}$ and may output a first intermediate DC signal at $V_{INT1}$ based on the duty clock signal and a comparison of $V_{REF}$ and $V_{INT2}$. In these and other embodiments, $V_{INT1}$ may be greater than $V_{IN}$. Additionally or alternatively, the boost circuit may adjust $V_{INT1}$ so that $V_{INT2}$ approaches $V_{REF}$.

In some embodiments, a voltage converter circuit may receive the first intermediate DC signal at $V_{INT1}$ and a clock signal and may output the second intermediate DC signal at $V_{INT2}$ based on the clock signal and $V_{INT1}$. $V_{INT2}$ may be greater than $V_{INT1}$. In these and other embodiments, the boost regulator may operate in a regulated state and the voltage converter circuit may operate in an unregulated state. Likewise, a voltage driver circuit may receive the second intermediate DC signal at $V_{INT2}$ and may output the AC signal at $V_{OUT}$ based on the second intermediate DC signal at $V_{INT2}$. In some embodiments, the boost circuit may adjust $V_{INT1}$ so as to cause $V_{INT2}$ to approach $V_{REF}$ which may cause $V_{OUT}$ to be output to the external device at the appropriate level.

In some embodiments, the low-voltage converter power controller IC may control the high-voltage IC so as to cause the high-voltage IC to output $V_{OUT}$ at the appropriate level. For example, the low-voltage IC may provide the duty clock signal to the boost regulator so as to control a configurable duty cycle (e.g., 50%) of components within the boost regulator. Likewise, the low-voltage IC may provide the clock signal to the voltage converter circuit so as to control a frequency of a clock rate within the voltage converter circuit. Additionally or alternatively, the low-voltage IC may determine a current of the first intermediate DC signal and $V_{OUT}$ and may adjust the duty clock signal based on the first intermediate DC signal and $V_{OUT}$.

The system may be configured to increase power efficiency, increase accuracy of the AC signal and $V_{OUT}$ over a wide range of power levels of the input DC signal. Likewise, the system may allow design and implementation of a cheaper and smaller chip.

Various embodiments disclosed herein relate to an inverter supply system on a chip (ISSoC™), which may include a micro-inverter and may be suitable for DC-to-AC grid tied power inverters. A multi-chip module (ISSoC) may include connectivity with a smart meter via, for example, wire and/or wireline communication to provide power grid operators visibility and command and control to divert photovoltaic (PV) generated electricity from, for example, micro generation sites to grid use in a case of demand response. According to various embodiments, an ISSoC may increase efficiency of PV components and/or electric vehicle (EV) components (e.g., inverters) (e.g., to over 97%). Further, in some embodiments, an ISSoC may track an amount of micro generation electricity in real time and provide command and control functions (e.g., to avoid grid failures).

In some embodiments, a micro-inverter, which may use capacitor banks for boosting the power and current, may be sized (e.g., sufficiently small) to be mounted inside a PV panel, and may include measurement, communication, and control features.

Embodiments of the present disclosure are explained with reference to the accompanying drawings.

Figure 1:
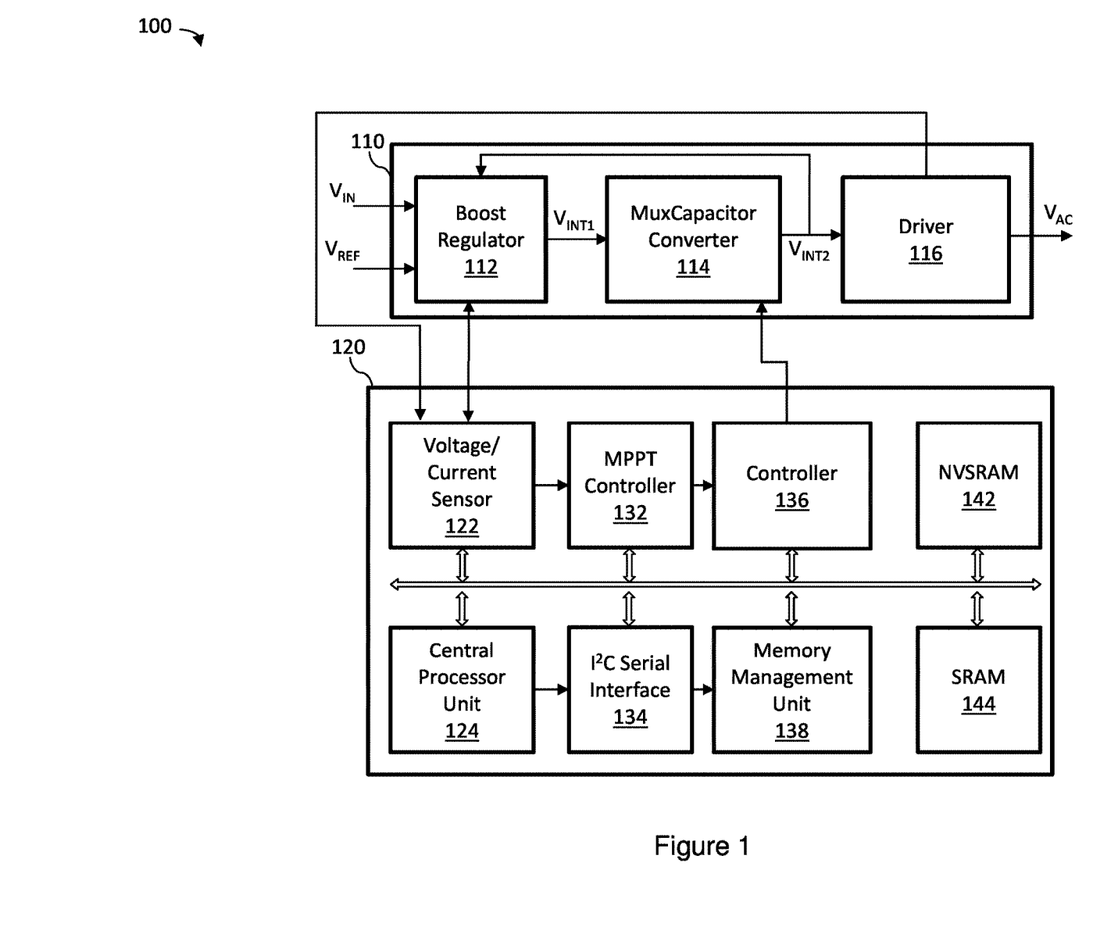
FIG. 1 illustrates an example system of electrical components implementing voltage multiplication.

FIG. 1 illustrates an example system 100 of electrical components configured for voltage multiplication, in accordance with one or more embodiments of the present disclosure. The system 100 may include IC 110 and an IC 120 coupled to IC 110. IC 110, which may include a high-voltage converter IC, includes a boost regulator (also referred to herein as a "voltage boost circuit") 112, a converter (also referred to herein as "muxcapacitor converter," "muxcap," or a "voltage converter circuit") 114, and a driver (also referred to herein as a "voltage driver circuit") 116, which may include an H-Bridge. In some embodiments, the converter 114 may include N-Channel switches such as switches using metal-oxide-semiconductor field-effect transistor (MOSFET), metal-semi conductor field-effect transistor (MESFET), double-diffused metal-oxide-semiconductor (DMOS), complementary metal-oxide-semiconductor (CMOS) silicon on insulators (SOI), semiconductor super junction (SJ), and/or Gallium Nitride (GaN) technologies. As depicted, the converter 114 may be coupled between the boost regulator 112 and the driver 116. According to some embodiments, the converter 114 may include a switch capacitor voltage divider circuit as described in U.S. Pat. No. 9,673,717, entitled "Electrical Circuit for Delivering Power to Consumer Electronic Devices," filed on Jan. 15, 2016, the contents of which are incorporated by reference.

Further, IC 120, which may include a low-voltage power controller IC, includes a voltage/current sensor 122, a central processor unit 124, a maximum power point tracking (MPPT) controller 132, an I2C serial interface 134, a controller (also referred to herein as a "muxcapacitor controller") 136, a memory management unit 138, NVSRAM 142, and SRAM 144.

In some embodiments, the boost regulator 112 may be configured to receive the input DC signal at voltage $V_{IN}$ and a duty clock signal. In these and other embodiments, the boost regulator 112 may convert the input DC signal to an intermediate DC signal at voltage $V_{INT1}$, which may be greater than voltage $V_{IN}$. Additionally or alternatively, the boost regulator 112 may receive the duty clock (e.g., from voltage/current sensor 122), which may control a duty cycle of components within the boost regulator 112. In some embodiments, the boost regulator 112 may receive a second intermediate DC signal at $V_{INT2}$ from the converter 114. In these and other embodiments, the boost regulator 112 may also receive a reference DC signal at voltage $V_{REF}$, which may be a voltage that voltage $V_{INT2}$ is to be equal to or similar to.

Additionally or alternatively, the boost regulator 112 may output the intermediate DC signal so that voltage $V_{INT1}$ is greater than voltage $V_{IN}$. Likewise, the boost regulator 112 may output the intermediate DC signal at the second DC voltage. In these and other embodiments, the second DC voltage may be a voltage that the voltage $V_{INT1}$ is to be equal or similar to.

In some embodiments, the converter 114 may be configured to receive the intermediate DC signal at the second DC voltage. In these and other embodiments, the converter 114 may invert the intermediate DC signal at the second DC voltage to an intermediate AC signal at a first AC voltage. In these and other embodiment, the converter 114 may output the intermediate AC signal at the first AC voltage. Additionally or alternatively, the driver 116 may be configured to receive the intermediate AC signal at the first AC voltage. In some embodiments, the driver 116 may convert the intermediate AC signal at the first AC voltage to the output AC signal $V_{OUT}$ at the second AC voltage.

In some embodiments, the voltage/current sensor 122 may be configured to receive a current signal from boost regulator 112, and provide a duty clock signal having a selectable duty cycle (e.g., 50% duty cycle) to the boost regulator 112. Further, the voltage/current sensor 122 may be configured to receive a voltage sense signal from the driver 116. The voltage/current sensor 122 may further be configured to output a digital current sense signal to MDPT controller 132, and controller 136 may be configured to output a digital frequency control signal (also referred to herein as a "clock signal"), which may be received by the converter 114.

In at least one contemplated application, IC 110 may receive an output signal (e.g., a voltage signal) of a solar panel and provide high-current and voltage boosting with the use of the boost regulator 112. In some embodiments, the boost regulator 112 may be programmed based upon the application and may use pulse-width modulation (PWM) to regulate an output voltage (e.g., $V_{OUT}$). Further, the converter 114 may use switched-capacitor and/or charge pump techniques to provide additional gain at high-efficiency. Further, the driver 116 may be configured to drive one or more phases of an external LC network for generation of the output voltage.

In accordance with various embodiments, the IC 120 may provide sensing and control functions that may be required by IC 110. For example, voltage and current may be sensed and digitized by IC 120 for use by MPPT controller 132, which may be configured to enhance the efficiency of the converter 114. In some embodiments, an embedded microprocessor may dynamically manage the converter 114 to regulate an output voltage (e.g., $V_{OUT}$) and optimize efficiency for each mode of operation, from the initial application of power, to the normal operating mode or an ultra-low power sleep mode (e.g., less than one milliwatt standby). On-chip volatile and non-volatile memory may also be provided for the CPU 124, which may include application-specific firmware that may be required by an end product (e.g. regulation, control, communication, etc.).

The I2C serial interface 134 may be configured to provide user programming, debugging, and control. Thus, in some embodiments, an output of a communication port (e.g., of an ISSoC) may be accessible (e.g., visible) (e.g., to a homeowner and the power grid) (e.g., to an electric vehicle driver and a computer located within the electric vehicle) such that actual electricity generation may be tracked in real time, and power may be diverted to a specific portion of the grid (e.g., during a demand response initiative by a grid operator).

Figure 2:
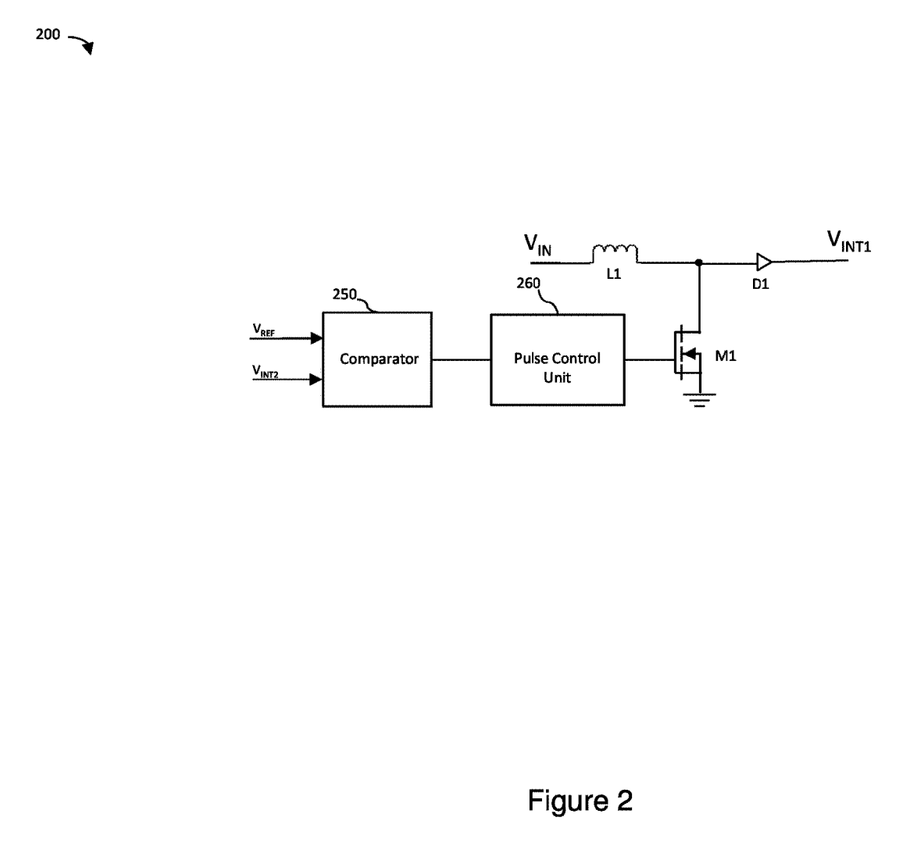
FIG. 2 illustrates an example boost converter circuit that may be used in the example system of FIG. 1.

FIG. 2 illustrates an example boost converter circuit 200 that may be used in the example system of FIG. 1, in accordance with one or more embodiments of the present disclosure. For example, the boost regulator 112 of FIG. 1 may include the boost converter circuit 200 shown in FIG. 2. As illustrated, the boost converter circuit 200, which includes a switched inductor boost converter, includes an inductor L1, a diode D1, a comparator 250, a pulse control unit 260, and a switching element (e.g., a MOSFET) M1. Pulse control unit 260 may include, for example, a servo loop control circuit.

The boost converter circuit 200 is configured to receive the voltage $V_{IN}$ and the voltage $V_{INT2}$, and output the voltage $V_{INT1}$. In some embodiments, the voltage $V_{IN}$ may be boosted and charge transferred from the input to the output by the switching element M1. High efficiency may be obtained with the use of pulse-width modulation (PWM) control of the switching element M1. Pulse control unit 260 may be configured to sense the output voltage of a voltage converter circuit (e.g., converter 114; see FIG. 1) and control the configuration of switching element M1 to enhance power efficiency while regulating the output voltage (e.g., voltage $V_{INT2}$).

Figure 3:
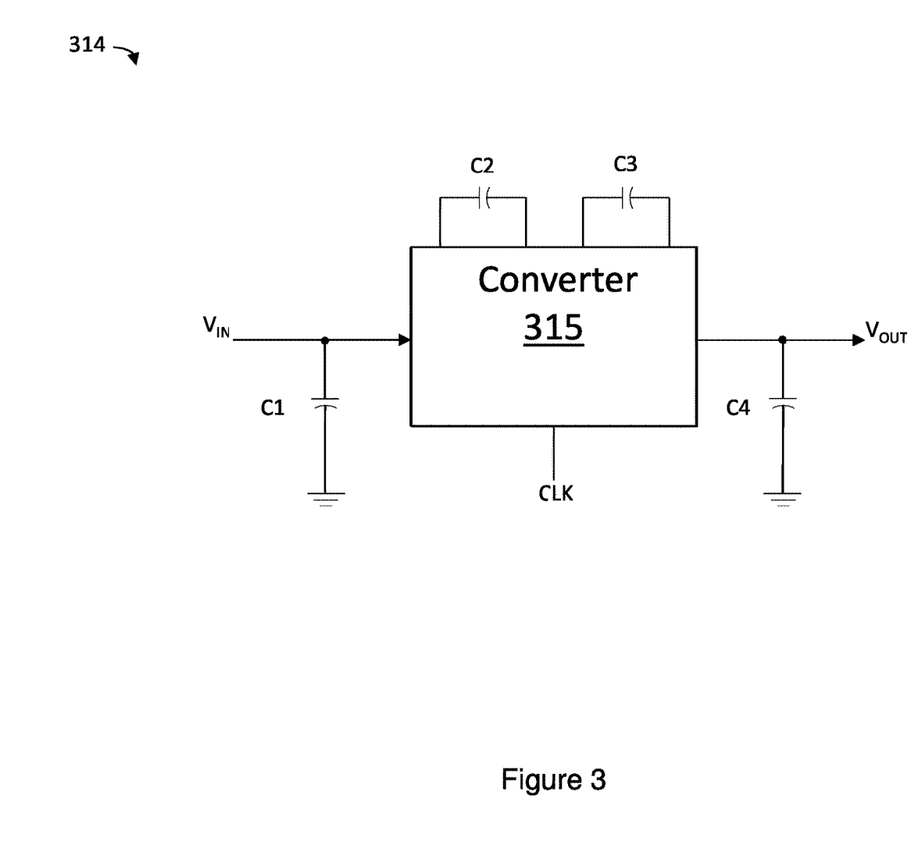
FIG. 3 illustrates an example voltage converter that may be used in the example system of FIG. 1.

FIG. 3 illustrates an example voltage converter circuit 314 that may be used in the example system of FIG. 1, in accordance with one or more embodiments of the present disclosure. For example, converter 114 of FIG. 1 may include voltage converter circuit 314. The voltage converter circuit 314 includes a converter stage 315 and capacitors C1-C4. The voltage converter circuit 314 is configured to receive a clock signal $f_{CLK}$ (e.g., from controller 136 of FIG. 1) and the voltage $V_{INT}$. The voltage converter circuit 314 may further be configured to generate the voltage $V_{INT2}$.

In some embodiments, the voltage converter circuit 314 may utilize switched-capacitor and charge pump technology to provide additional gain for voltage multiplication. Further, some embodiments may be suitable for high-voltage applications, and may achieve, for example, 98% power efficiency or more from no load to a maximum current load. In addition, the voltage converter circuit 314 may be digitally configurable to provide multiple gain and attenuation ratios and may be configured to meet, for example, the wide range of solar panel vendor requirements. According to some embodiments, high-voltage switches, their gate drivers, and support circuitry may be integrated on a high-voltage DMOS or super-junction semiconductor foundry process, thus reducing the bill of material cost as compared to conventional switched inductor based solutions. Likewise, high-voltage switches, their gate drivers, and support circuitry may be integrated on a CMOS or GaN semiconductor foundry process, thus reducing the bill of material cost as compared to conventional switched inductor based solutions. Moreover, the external capacitors (e.g., capacitors C) may include low-cost ceramic capacitors available from component vendors.

Since regulation of a micro-inverter may be provided by a switched inductor boost converter, in some embodiments, an converter (e.g., converter 114 of FIG. 1) may be configured as an open loop and may be un-regulated, which may increase power efficiency. The power efficiency may be limited only by $RDS_{ON}$ of one or more semiconductor switches, the IR drop of the interconnects, the dynamic switching losses, etc. For example, the gate to source capacitance of the switches may be in the 3 pF-5 pF range, and the fCV current may be approximately 4 µA/switch. Additionally, the gate to source capacitance of the switches may be up to NpF in some embodiments. According to some embodiments, to accommodate higher output currents, multiple voltage converter circuits may be connected in parallel for lower output resistance. Further, the fly back and hold capacitors may be shared among multiple branches. For example, for a 7 switch, 5 parallel branch voltage converter network, the dynamic current (overhead current) may be approximately 700 µA, which may reduce the power efficiency by less than approximately 0.29%. Additionally, capacitors C1-C4 may include one or more capacitors. For example, capacitor C1 may include two capacitors, capacitor C2 may include four capacitors, and capacitor C3 may include seven capacitors.

Figure 4:
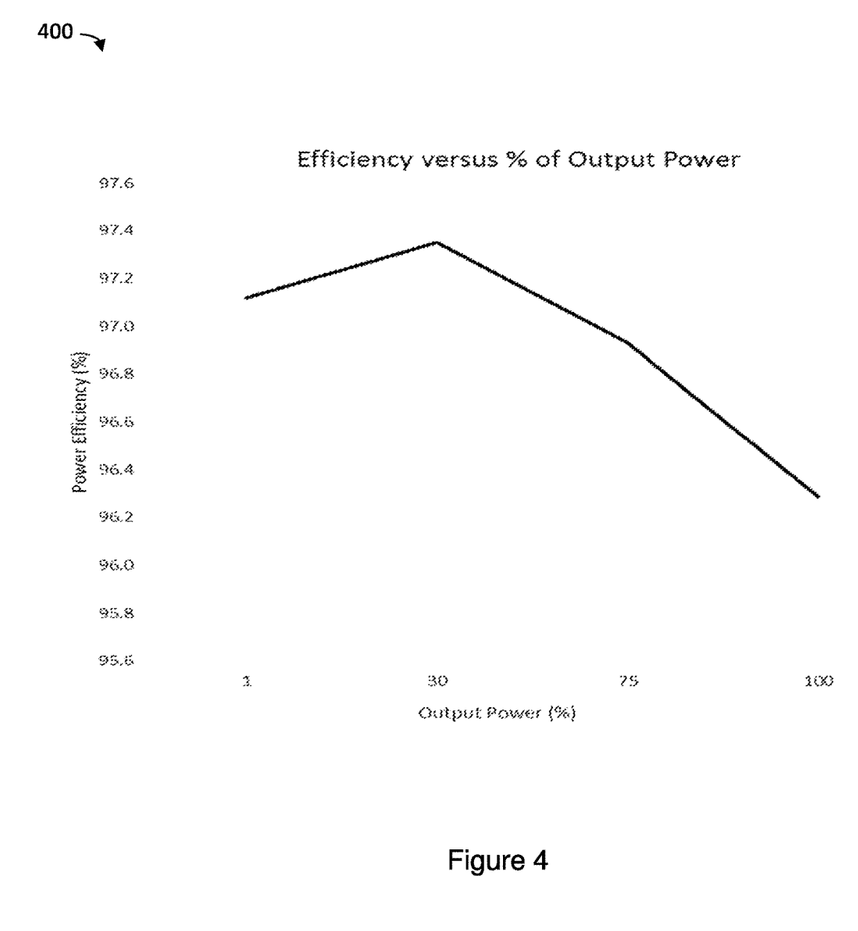
FIG. 4 illustrates a graphical representation of a simulation of micro-converter output power versus efficiency.

FIG. 4 illustrates a graphical representation of a simulation of micro-inverter output power versus efficiency, in accordance with one or more embodiments of the present disclosure. More specifically, FIG. 4 shows the power efficiency of the DC/DC booster across an output power range. The output voltage was increased to 375V DC from 32V DC with +/−1% load regulation. In this example, a load current of 100 mA to 10 mA was applied to a single voltage converter stage.

As disclosed herein, various embodiments relate to a converter suitable for high-voltage applications (e.g., 100V-400V) and may provide more than 97% power efficiency from no load to a maximum current load. Further, the inverter may be digitally configurable to provide multiple gain and attenuation ratios and may be programmable for various applications, such as to meet a wide range of solar panel vendor requirements.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:
1. A system, comprising:
 a boost circuit configured to:
  receive a direct current (DC) signal at a first DC voltage, a duty clock signal, and a reference DC signal at a second DC voltage, wherein the duty clock signal controls a duty cycle of components within the boost circuit;

generate a first intermediate DC signal at a third DC voltage based on the duty clock signal and a comparison of the reference DC signal and a second intermediate DC signal received at a fourth DC voltage, wherein the boost circuit is further configured to adjust the third DC voltage of the first intermediate DC signal to cause the fourth DC voltage of the second intermediate DC signal to approach the second DC voltage of the reference DC signal based on the comparison of the reference DC signal and the second intermediate DC signal;

a voltage converter circuit electrically coupled to the boost circuit and configured to:
  receive the first intermediate DC signal at the third DC voltage;
  receive a clock signal; and
  generate the second intermediate DC signal at the fourth DC voltage, wherein the fourth DC voltage of the second intermediate DC signal is greater than the third DC voltage of the first intermediate DC signal;

a voltage driver circuit electrically coupled to the voltage converter circuit and configured to:
  receive the second intermediate DC signal at the fourth DC voltage; and
  generate an alternating current (AC) signal at an AC voltage based on the second intermediate DC signal at the fourth DC voltage;

a low voltage circuit electrically coupled to the boost circuit, the voltage converter circuit, and the voltage driver circuit and configured to:
  determine a current of the first intermediate DC signal;
  determine the fourth DC voltage of the second intermediate DC signal;
  generate the duty clock signal based on the second intermediate DC signal at the fourth DC voltage, wherein the duty clock signal adjusts a duty cycle of the boost circuit;
  generate the clock signal based on the current of the first intermediate DC signal and the fourth DC voltage of the second intermediate DC signal, wherein the clock signal adjusts a clock rate within the voltage converter circuit; and
  transmit the clock signal to the voltage converter circuit.

2. The system of claim 1, further comprising an LC filter circuit electrically coupled to the voltage driver circuit and configured to:
  receive the AC signal at the AC voltage; and
  generate a filtered AC signal based on the AC signal at the AC voltage.

3. The system of claim 1, the low voltage circuit comprising a voltage/current determination circuit electrically coupled to the boost circuit and the voltage converter circuit and configured to:
  determine the current of the first intermediate DC signal;
  determine the fourth DC voltage of the second intermediate DC signal;
  generate the duty clock signal based on the second intermediate DC signal at the fourth DC voltage; and
  generate a control signal based on the current of the first intermediate DC signal and the fourth DC voltage of the second intermediate DC signal.

4. The system of claim 3, the low voltage circuit further comprising:
  a maximum power point (MPPT) controller circuit electrically coupled to the voltage/current determination circuit and configured to:
    receive the control signal; and
    generate a clock control signal based on the control signal; and
  a converter controller electrically coupled to the MPPT controller circuit and the voltage converter circuit and configured to:
    receive the clock control signal;
    generate the clock signal based on the clock control signal; and
    transmit the clock signal to the voltage converter circuit.

5. The system of claim 1, wherein the clock signal comprises a pulse width modulated signal.

6. The system of claim 1, wherein the boost circuit comprises:
  a comparator circuit electrically coupled to the voltage converter circuit and configured to:
    receive the reference DC signal at the second DC voltage;
    receive the second intermediate DC signal at the fourth DC voltage;
    compare the reference DC signal and the second intermediate DC signal; and
    generate a comparison signal based on the comparison of the reference DC signal and the second intermediate DC signal;
  a servo loop control circuit electrically coupled to the comparator circuit and configured to:
    receive the comparison signal; and
    generate a gate driver signal based on the comparison signal; and
  a switching inductive circuit electrically coupled to the servo loop control circuit and configured to:
    receive the DC signal at the first DC voltage, the duty clock signal, and the gate driver signal; and
    generate the first intermediate DC signal at the third DC voltage based on the duty clock signal and the gate driver signal, wherein the switching inductive circuit is further configured to adjust the third DC voltage of the first intermediate DC signal to cause the fourth DC voltage of the second intermediate DC signal to approach the second DC voltage of the reference DC signal based on the gate driver signal and the duty clock signal.

7. The system of claim 6, wherein the switching inductive circuit comprises a MOSFET comprising a gate, an inductor, and a diode.

8. The system of claim 1, wherein the voltage converter circuit comprises a voltage converter stage circuit comprising N-Channel devices electrically coupled to the boost circuit and the voltage driver circuit and is configured to:
  receive the first intermediate DC signal at the second DC voltage;
  receive the clock signal, wherein the clock signal modifies a frequency of the clock rate within the voltage converter stage circuit; and
  generate the second intermediate DC signal at the fourth DC voltage, wherein the fourth DC voltage of the second intermediate DC signal is greater than the third DC voltage of the first intermediate DC signal.

9. The system of claim 8, wherein the voltage converter circuit further comprises:
  a plurality of first capacitive elements electrically coupled in parallel with the voltage converter stage circuit;
  a second capacitive element electrically coupled to the boost circuit, the voltage converter stage circuit, and ground; and a third capacitive element electrically coupled to the voltage converter stage circuit, the voltage driver circuit, and ground.

10. The system of claim 1, wherein the boost circuit and the voltage converter circuit operate in a regulated state.

11. The system of claim 1, wherein the voltage converter circuit comprises a first voltage converter circuit, the system further comprising a second voltage converter circuit electrically coupled in parallel with the first voltage converter circuit.

12. A system, comprising:
a boost circuit comprising:
a comparator circuit configured to:
receive a reference DC signal at a second DC voltage;
generate a comparison signal based on a comparison of the reference DC signal and a second intermediate DC signal received at a fourth DC voltage;
a servo loop control circuit electrically coupled to the comparator circuit and configured to:
receive the comparison signal; and
generate a gate driver signal based on the comparison signal; and
a switching inductive circuit electrically coupled to the servo loop control circuit and a voltage converter circuit and configured to:
receive a DC signal at a first DC voltage and a duty clock signal, wherein the duty clock signal controls a duty cycle of components within the boost circuit; and
generate a first intermediate DC signal at a third DC voltage based on the duty clock signal and the gate driver signal;
the voltage converter circuit electrically coupled to the switching inductive circuit and the comparator circuit and configured to:
receive the first intermediate DC signal at the third DC voltage;
receive a clock signal; and
generate the second intermediate DC signal at the fourth DC voltage, wherein the fourth DC voltage of the second intermediate DC signal is greater than the third DC voltage of the first intermediate DC signal, and wherein the switching inductive circuit is configured to adjust the third DC voltage of the first intermediate DC signal to cause the fourth DC voltage of the second intermediate DC signal to approach the second DC voltage of the reference DC signal based on the gate driver signal and the duty clock signal;
a voltage driver circuit electrically coupled to the voltage converter circuit and configured to:
receive the second intermediate DC signal at the fourth DC voltage; and generate an AC signal at an AC voltage based on the second intermediate DC signal at the fourth DC voltage; and
an LC filter circuit electrically coupled to the voltage driver circuit and configured to:
receive the AC signal at the AC voltage; and
generate a filtered AC signal based on the AC signal at the AC voltage;
a low voltage circuit electrically coupled to the boost circuit, the voltage converter circuit, and the voltage driver circuit and configured to:
determine a current of the first intermediate DC signal;
determine the fourth DC voltage of the second intermediate DC signal;
generate the duty clock signal based on the second intermediate DC signal at the fourth DC voltage, wherein the duty clock signal adjusts a duty cycle of the boost circuit;
generate the clock signal based on the current of the first intermediate DC signal and the fourth DC voltage of the second intermediate DC signal, wherein the clock signal adjusts a clock rate within the voltage converter circuit; and
transmit the clock signal to the voltage converter circuit.

13. The system of claim 12, the low voltage circuit comprising:
a voltage/current determination circuit electrically coupled to the boost circuit and the voltage converter circuit and configured to:
determine the current of the first intermediate DC signal;
determine the fourth DC voltage of the second intermediate DC signal;
generate the duty clock signal based on the second intermediate DC signal at the fourth DC voltage; and
generate a control signal based on the current of the first intermediate DC signal and the fourth DC voltage of the second intermediate DC signal;
an MPPT controller circuit electrically coupled to the voltage/current determination circuit and configured to:
receive the control signal; and
generate a clock control signal based on the control signal; and
a converter controller electrically coupled to the MPPT controller circuit and the voltage converter circuit and configured to:
receive the clock control signal;
generate the clock signal based on the clock control signal; and
transmit the clock signal to the voltage converter circuit.

* * * * *

UNITED STATES PATENT AND TRADEMARK OFFICE
CERTIFICATE OF CORRECTION

PATENT NO. : 10,218,275 B2
APPLICATION NO. : 15/667419
DATED : February 26, 2019
INVENTOR(S) : Sandusky et al.

Page 1 of 1

It is certified that error appears in the above-identified patent and that said Letters Patent is hereby corrected as shown below:

On the Title Page

Item [72] insert:
--Madison Hayes Yarbo Freeman
Michael H. Freeman
Mitchael C. Freeman
Robert Dieter--

Signed and Sealed this
Seventeenth Day of September, 2019

Andrei Iancu
*Director of the United States Patent and Trademark Office*